United States Patent [19]

Morrison

[11] 4,391,579

[45] Jul. 5, 1983

[54] HOT SPRUE VALVE ASSEMBLY FOR AN INJECTION MOLDING MACHINE

[75] Inventor: Rocky V. Morrison, Redondo Beach, Calif.

[73] Assignee: Discovision Associates, Costa Mesa, Calif.

[21] Appl. No.: 304,421

[22] Filed: Sep. 23, 1981

[51] Int. Cl.³ ............................................. B29D 17/00
[52] U.S. Cl. ................................... 425/548; 425/549; 425/563; 425/564; 425/568; 425/573; 425/810
[58] Field of Search ............... 425/548, 549, 562, 563, 425/564, 568, 572, 573, 574, 575, 588, 810; 264/328.7, 328.9, 328.11

[56] References Cited

U.S. PATENT DOCUMENTS 4,260,360 4/1981 Holmes .............................. 425/548
4,290,744 9/1981 Dannels ...................... 264/328.7 X

FOREIGN PATENT DOCUMENTS 46-18627 5/1971 Japan ................................... 425/564

Primary Examiner—Thomas P. Pavelko

[57] ABSTRACT

A hot sprue valve assembly is provided for controlling flow of molten material into the mold cavity of an injection molding machine. The valve assembly is particularly designed for use with an injection molding machine for molding centrally apertured record discs, such as video information discs. The valve assembly comprises a stationary valve body supporting a movable valve member for sliding motion toward and away from the mold cavity. The valve member includes a hot sprue bushing defining a heated flow path for passage of molten material toward the mold cavity, and a dispersion head carried by the bushing for directing the molten material to flow in a generally radially outward direction through gate passages with substantially uniform radial distribution into the mold cavity. In one position, the valve member is advanced into the mold cavity to align the gate passages with the mold cavity and thereby permit flow of the molten material into the mold cavity. The valve member is movable to retract the gate passages from alignment with the mold cavity to prevent flow of the molten material into the mold cavity. In this retracted position, a portion of the dispersion head remains within a central portion of the mold cavity to mold a central aperture into the disc prior to solidification of the molten material.

7 Claims, 5 Drawing Figures

HOT SPRUE VALVE ASSEMBLY FOR AN INJECTION MOLDING MACHINE

BACKGROUND OF THE INVENTION

This invention relates generally to injection molding machines, and more particularly, to injection molding machines including means for controlling flow of molten material into a mold cavity of a machine molding assembly designed for molding a centrally apertured record disc, such as a video information disc, and for molding a central aperture into such disc.

An example of an injection molding machine of this general type is disclosed in copending and commonly assigned patent application U.S. Ser. No. 847,367, filed in the name of J. R. Holmes et al., and entitled "Method and Means for Replicating Centrally Apertured Video Disc Records", and U.S. Ser. No. 031,205, filed in the name of J. R. Holmes, and entitled "Molding Apparatus for Producing Centrally Apertured Record Discs". The machines described in these applications comprise injection molding machines having a molding assembly with first and second mold halves reciprocally movable between a closed position defining an annular mold cavity into which molten disc-forming material of plastic or the like is injected to form a video information disc, and an open position wherein the mold cavity parting line is opened and the resultant molded video information disc is removed from the machine. The mold cavity is lined by one or more disc-shaped stamping dies carried by the mold halves and these stamping dies include discontinuous surface configurations representative of the information to be formed on the disc.

In injection molding machines of this general type, it is well known to inject molten plastic material under pressure from an injector gun assembly through a sprue bushing and into the mold cavity. When the mold cavity is filled with the molten plastic material, the respective mold halves and the sprue bushing are cooled by a circulating liquid coolant to reduce the temperature of the molten plastic material and thereby solidify the material. After solidification, the molded information disc is removed from the machine and the cycle restarted, thereby allowing a relatively rapid production rate of the information discs. However, the plastic material within the sprue bushing typically has a relatively large thickness compared with the plastic material within the mold cavity, whereby the plastic material within the sprue bushing takes the longest time to solidify. The cycle time for molding the information discs in machines of this type therefore tends to be dependent upon the longer cooling time of the material within the sprue bushing, and not upon the shorter cooling time of the material within the mold cavity. Moreover, this material within the sprue bushing when solidified comprises wasted plastic material which must be removed from the molded information disc as by means of a punch assembly or the like, to yield the desired thin, substantially planar information disc including the required central aperture.

Formation of the central aperture by means of a conventional punch assembly as disclosed generally in the above-referenced copending patent applications poses a variety of problems in the production of the information discs. For example, the punch step requires a certain cycle time to perform, thereby prolonging the cycle time for each information disc. Moreover, the use of the punch assembly to form the central aperture results in an aperture shape having a concentricity dependent upon the state of wear of the punch die. As punch die wear progresses, the likelihood of the creation of debris in the vicinity of the aperture increases, and such debris can deleteriously affect the quality of subsequently molded information discs. Finally, the use of a punch assembly places the information disc under substantial stress which occasionally can result in cracking of the disc in the region of the aperture, whereupon the disc must be rejected as scrap.

Some attempts have been proposed to mold an aperture in the information disc prior to solidification of the disc-forming material and thereby avoid use of a punch assembly. See, for example, copending and commonly assigned U.S. application Ser. No. 202,824, filed in the name of A. Cane et al., and entitled "Hot Sprue Valve Assembly for an Injection Molding Machine" which discloses a valve assembly positioned across the mold cavity from the sprue bushing and operable to mold the central aperture while controlling flow of molten material into the mold cavity. However, this type of aperture-molding valve assembly requires relatively complex valve actuation devices and requires solidification of at least a portion of the disc-forming material within the region of the aperture and within the sprue bushing before the parting line can be opened and the molded disc removed. Accordingly, minimum disc cycle time is still not achieved and solidified material discarded as scrap is not avoided.

Other attempts have been made to mold an aperture in the information disc without requiring solidification and waste of any portion of the disc-forming material in the vicinity of the formed aperture or within the sprue bushing. See, for example, copend-and commonly assigned U.S. application Ser. No. 202,838 filed in the name of B. F. P. Mayer et al., and entitled "Hot Sprue Valve Assembly for an Injection Molding Machine" which discloses a poppet valve structure movable in response to relatively complex valve actuation devices positioned across the mold cavity from the sprue bushing. See also, for example, copending and commonly assigned U.S. application Ser. No. 272,431, filed in the name of A. Taylor, and entitled "Hot Sprue Sleeve Valve Assembly for an Injection Molding Machine", which discloses a sleeve valve slidably carried about the sprue bushing for movement through the mold cavity to control flow of disc-forming material and to mold a central aperture into the resultant disc. However, in these referenced structures, the valve member is provided separate from the sprue bushing and thus comprises an additional mechanical component which increases the overall cost, complexity, and the opportunity for malfunction of the machine.

The present invention constitutes an improvement over prior hot sprue valve assemblies by providing an injection molding machine with a hot sprue bushing and a valve member integrated into a single moving component for controlling flow of molten material into the mold cavity and for molding a central aperture into an information disc prior to solidification of the material within a mold cavity.

SUMMARY OF THE INVENTION

The present invention is embodied in an improved injection molding machine for use in producing centrally apertured record discs, such as video information discs. The machine includes a molding assembly having first and second mold halves reciprocally movable with respect to each other between a closed position defining an annular mold cavity into which molten disc-forming material, such as a molten plastic material, is injected to form the disc, and an open position wherein the mold is opened and the molded disc can be extracted from the machine. At least one surface of the annular mold cavity is defined by a planar, disc-shaped stamping die carried by one of the two mold halves for use in imparting appropriate information to the surface of the molded disc.

According to the invention, the molding assembly for the machine includes an improved hot sprue valve assembly having a movable valve member carried for sliding movement within a stationary valve body mounted securely on the first mold half of the machine. The movable valve member is shaped to define a hot sprue bushing having a central bore for passage of the molten disc-forming material at an elevated temperature toward the mold cavity. This hot sprue bushing bore is oriented gradually at a right angle with respect to the plane of the mold cavity and is aligned axially with the central axis of the mold cavity. The molten disc-forming material is thus injected through the hot sprue bushing toward the mold cavity along an axis generally coincident with a central aperture to be molded into the information disc.

The movable valve member further includes a dispersion head secured to the hot sprue bushing for movement therewith. This dispersion head comprises, in one preferred form, a generally cone-shaped body having a base positioned generally within the boundary of the central aperture to be formed in the disc and a top or apex projecting toward the central bore in the sprue bushing. This dispersion head is spaced from the open end of the bore by a series of annularly arranged spacer flights which define therebetween a plurality of generally radially open gate passages for flow of the molten material into the mold cavity. In some embodiments of the invention, heater means may be incorporated into the valve member for maintaining the temperature of the molten material in the vicinity of the dispersion head at a relatively high level to prevent solidification thereof.

In operation, the movable valve member is shifted back and forth between a first position with the gate passages opening into the mold cavity and a second position with the gate passages withdrawn or retracted from communication with the mold cavity. More particularly, when it is desired to inject material into the mold cavity, the valve member is advanced axially to move the dispersion head sufficiently across the mold cavity to align the gate passages for radial flow of the molten material into the mold cavity. When the mold cavity is filled and packed with the material, the valve member is retracted to withdraw the gate passages into the valve body and thereby prevent further flow of material into the mold cavity. When this occurs, the base of the dispersion head is moved axially into the mold cavity to mold a central aperture of the desired size and shape into the disc prior to solidification of the disc-forming material.

In one preferred arrangement of the invention, the valve member is biased by a spring, such as a Belleville spring, toward the retracted or second position normally to prevent flow of the molten material into the mold cavity. When material is injected under pressure through the sprue bushing, the pressurized material bears axially against the dispersion head to move the valve member toward the advanced or open position with the gate passages in alignment with the mold cavity. When the mold cavity is filled and the injection pressure is relieved, the spring returns the valve member to the retracted position.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
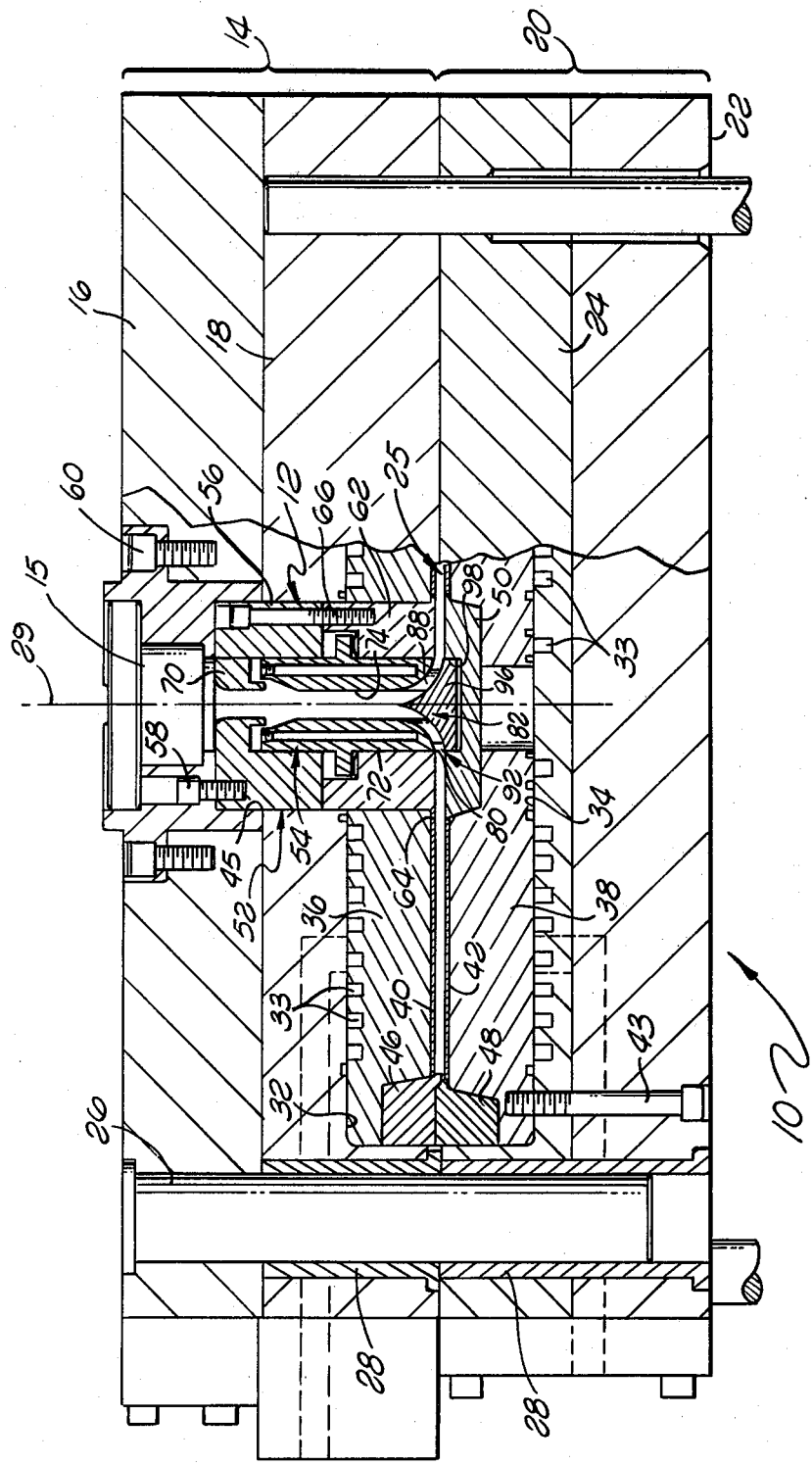
FIG. 1 is a simplified cross-sectional view of an injection molding machine including a hot sprue valve assembly embodying the novel features of this invention, said valve assembly being shown in an open position advanced into a mold cavity.

Referring now to the drawings, and particularly to FIG. 1, there is shown a molding apparatus 10 for use in combination with an injection molding machine (not shown) to produce a centrally apertured record disc, such as a video information disc. One suitable molding machine in which the molding apparatus 10 can be used comprises a 375 ton model manufactured by the Stokes Division of Pennwalt Manufacturing Co.

The molding apparatus 10 comprises a first mold half 14 including a base plate 16 and a carrier plate 18, and a second mold half 20 including a base plate 22 and a carrier plate 24. The first and second mold halves 14 and 20, along with their associated base and carrier plates 16, 18, and 22, 24 are reciprocally movable toward and away from each other to open and close a relatively thin, substantially planar mold cavity 25 in which the information disc is molded. More specifically, the mold halves 14 and 20 are movable between a closed position with their carrier plates 18 and 24 in abutting relation with each other to define the mold cavity 25 as shown in FIG. 1, and an open position with the carrier plates 18 and 24 separated from each other (not shown). A plurality of guide pins 26, one of which is shown in FIG. 1, are secured to the first mold half 14 and received slidably within bushings 28 in the carrier plate 18 and the second mold half 20 to maintain the two mold halves in a desired axial alignment with each other.

The carrier plates 18 and 24 of the two mold halves 14 and 20 respectively include annular plate-shaped recesses 32 and 34 facing toward each other generally in axial alignment for receiving annular platens 36 and 38, respectively. As illustrated, these platens 36 and 38 can be secured in position within the recesses 32 and 34 as by means of bolt 43, one of which is shown secured to the platen 38, all in a well-known manner. The platens 36 and 38 respectively carry annular disc-shaped stamping dies 40 and 42, wherein at least one of the dies has a surface configuration representative of the information to be cast into the molded information disc, and which cooperate with each other when the mold halves 14 and 20 are in the closed position to define the disc-shaped mold cavity 25. Annular clamping rings 46 and 48 can be provided about the circumference of the mold cavity 25 for securing the stamping dies 40 and 42 in fixed positions to their respective platens 36 and 38, all in a well-known manner. Annular center clamps such as the lower center clamp 50 shown with respect to the die 42 can also be provided for securing the stamping dies in position. The specific construction and operation of these various components is discussed in further detail in copending and commonly assigned U.S. application Ser. No. 031,205, filed Apr. 18, 1979, by John R. Holmes, and entitled "Apparatus for Producing Centrally Apertured Record Discs", the disclosure of which is incorporated herein by reference.

A hot sprue valve assembly 12 of this invention is secured to the first mold half 14 for controlled passage of a suitable molten disc-forming material, such as a molten plastic material, under pressure from an injector gun assembly into the mold cavity 25. More specifically, an injector gun assembly having a construction generally conventional in the art supplies the disc-forming material in a heated, flowable state in an appropriate quantity and under an appropriate pressure through a nozzle 15 to the hot sprue valve assembly 12. The hot sprue valve assembly 12 guides the molten material through the base plate 16 and the carrier plate 18 of the first mold half 14 for admission or injection into the disc-shaped mold cavity 25 generally along a central axis 29 of the mold cavity under the control of the hot sprue valve assembly, the operation of which will be described herein in more detail.

The hot sprue valve assembly 12 of this invention includes a valve body 52 mounted in a stationary position on the first mold half 14, and a movable valve member 54 carried for sliding movement toward and away from the mold cavity 25. In one position of operation, the valve member 54 permits passage of the molten disc-forming material into the mold cavity, whereas in another operative position the valve member simultaneously prevents further flow of the material into the mold cavity and molds a central aperture of a desired size and shape into the record disc being formed prior to solidification of the disc-forming material.

Figure 2:
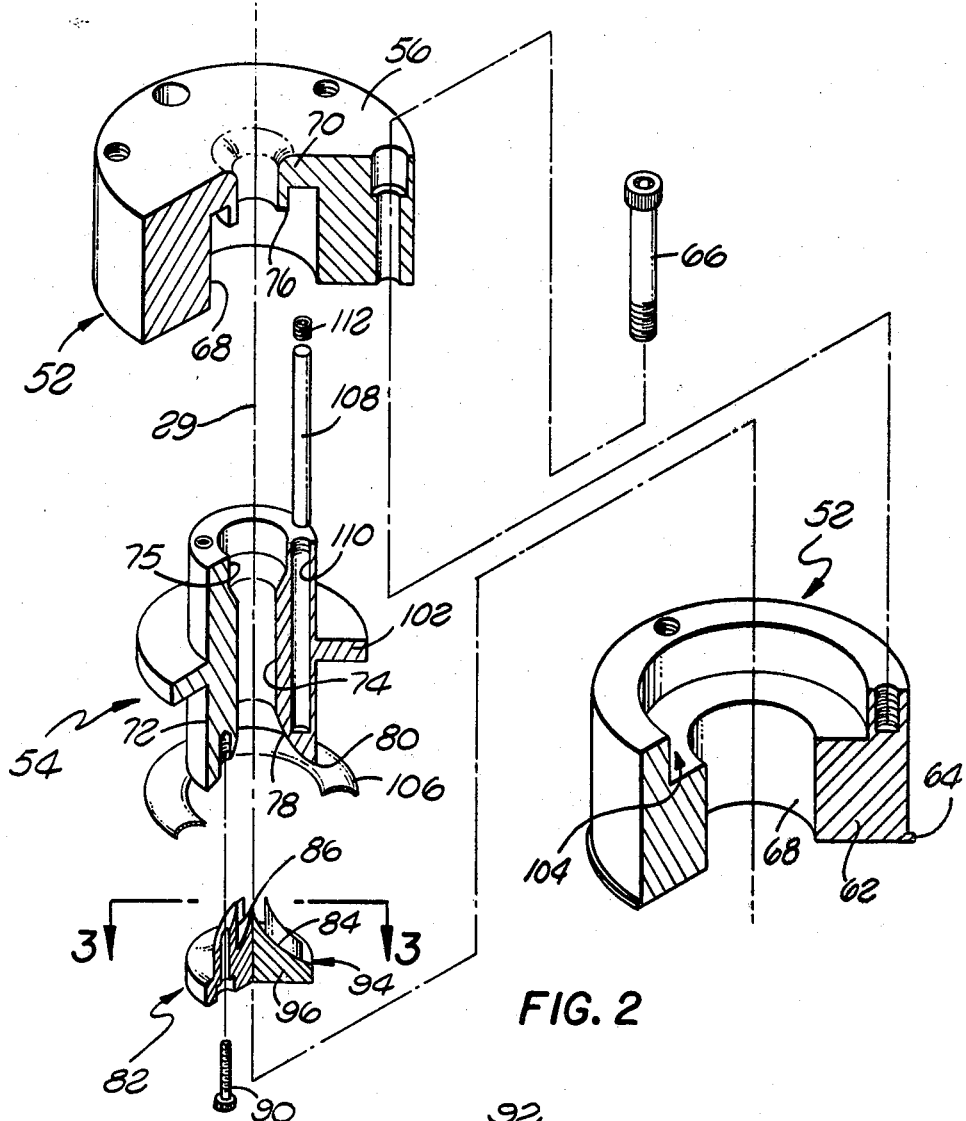
FIG. 2 is an exploded perspective view illustrating construction details of the hot sprue valve assembly, with portions broken away.

As shown best in FIGS. 1 and 2, the valve body 52 comprises a generally cylindrical structure extending in an axial direction through a matingly shaped opening 45 formed through the base and carrier plates 16 and 18 of the first mold half 14. This valve body 52 is conveniently divided into an upper section 56 secured with respect to the injector gun assembly nozzle 15 by a plurality of screws 58, wherein the nozzle 15 is in turn secured to the base plate 16 by a plurality of screws 60. The valve body further includes a lower section 62 which is secured to the carrier plate 18 by a plurality of screws 66, and which may include an outwardly radiating lower flange 64 to assist in clamping the upper stamping die 40 to the desired position. Thus, the upper and lower section 56 and 62 are mounted on the first mold half 14 for movement therewith as the mold halves 14 and 20 are reciprocated toward and away from each other to close and open the mold cavity 25.

The upper and lower sections 56 and 62 of the valve body 52 cooperate to define a central opening 68 oriented in substantial alignment with the central axis 29 of the mold cavity 25. This central opening has a generally circular cross section and is narrowed at its upper extent by an inwardly radiating flange 70. This flange 70, as illustrated in FIGS. 1 and 2, is configured for suitable connection to the injector gun assembly nozzle 15 for injection under pressure of molten disc-forming material in a downward direction into the central opening 68.

The valve member 54 is slidably carried within the central opening 68 of the valve body 52 for controlling flow of the injected material toward and into the mold cavity. More particularly, the valve member 54 comprises a generally tubular sprue bushing 72 sized and shaped for close sliding motion within the central opening into abutting engagement with the underside of the flange 70. This sprue bushing 72 has a central bore 74 formed therein to extend along the axis 29 toward the mold cavity 25. The molten material injected into the upper end of the valve body 52 thus passes downwardly into the bore 74 of the sprue bushing for flow toward the mold cavity. Conveniently, to assist in the guided flow of the material into the sprue bushing bore 74, the upper end 74 of this bore is radially enlarged for close sliding reception of a downturned annular lip 76 on the underside of the flange 70.

The sprue bushing 72 has a lower end positioned near the mold cavity 25 and configured to define a generally conical face 78 which sweeps arcuately from the bore 74 axially downwardly and turns radially outwardly to an outer peripheral edge 80. Accordingly, the lower end of the sprue bushing 72 is shaped to permit smooth turning of the molten material flow from the axial direction through the bore 74 gradually toward a radially outward direction for flow into the disc-shaped mold cavity 25, as will be described in more detail.

The valve member 54 further includes a dispersion head 82 mounted in spaced relation with the lower end of the sprue bushing 72 for movement with the sprue bushing to control flow of material into the mold cavity. This dispersion head, as viewed best in FIGS. 2 and 3, has a generally conical shape matching the arcuate curvature of the sprue bushing face 78 to provide an arcuately sweeping face 84 presented toward the sprue bushing 72 with its apex 86 positioned along the axis 29 in alignment with the bore 74. This dispersion head face 84 is axially spaced from the sprue bushing face 78 by a plurality of spacer flights 88 which are equiangularly arranged about the apex 86 and project upwardly from the dispersion head for bearing engagement with the sprue bushing. The upper ends of these spacer flights 88 are arcuately set to match the contour of the sprue bushing face 78, and fastening screws 90 are received upwardly through these flights and are threaded into the sprue bushing to secure the dispersion head 82 and the sprue bushing 72 with respect to each other.

Figure 3:
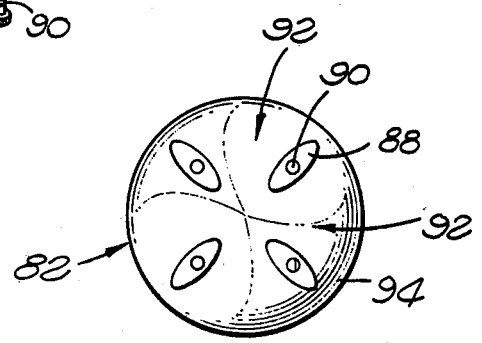
FIG. 3 is a top plan view of one portion of the valve assembly, taken generally on the line 3—3 of FIG. 2.

The spacer flights 88 are shaped to have a smoothly contoured cross-sectional shape, such as a radially elongated and generally elliptical shape as viewed in FIG. 3, whereby the spacer flights cooperate with each other to define therebetween a plurality of gate passages 92 for flow of molten disc-forming material. More specifically, material injected downwardly through the sprue bushing bore 74 toward the mold cavity 25 is converted into a substantially uniform annular flow stream upon impact with the apex 86 of the dispersion head. This annular flow stream is guided between the generally conical faces 78 and 84 of the sprue bushing and the dispersion head for division by the spacer flights 88 into a plurality of smaller flow streams for extruded passage through the gate passages 92. This division of the material into several flow streams assists in thoroughly mixing the material and in assuring a uniform heating and temperature distribution within the material. Importantly the spacer flights 88 terminate short of the radial periphery 94 of the dispersion head conical face 84 such that the material is allowed to remix and rehomogenize into a single annular flow stream prior to passage into the mold cavity.

The radial periphery 94 of the dispersion head conical face 84 constitutes the upper edge of a generally cylindrical base 96 of the dispersion head 72. This base 96 is positioned generally within the boundary of a central aperture to be molded into the resultant information disc and has a size and shape corresponding with the size and shape of the desired central aperture. Moreover, the base 96 is adapted for seated reception within a matingly-shaped recess 98 formed within the lower center clamp 50.

Figure 4:
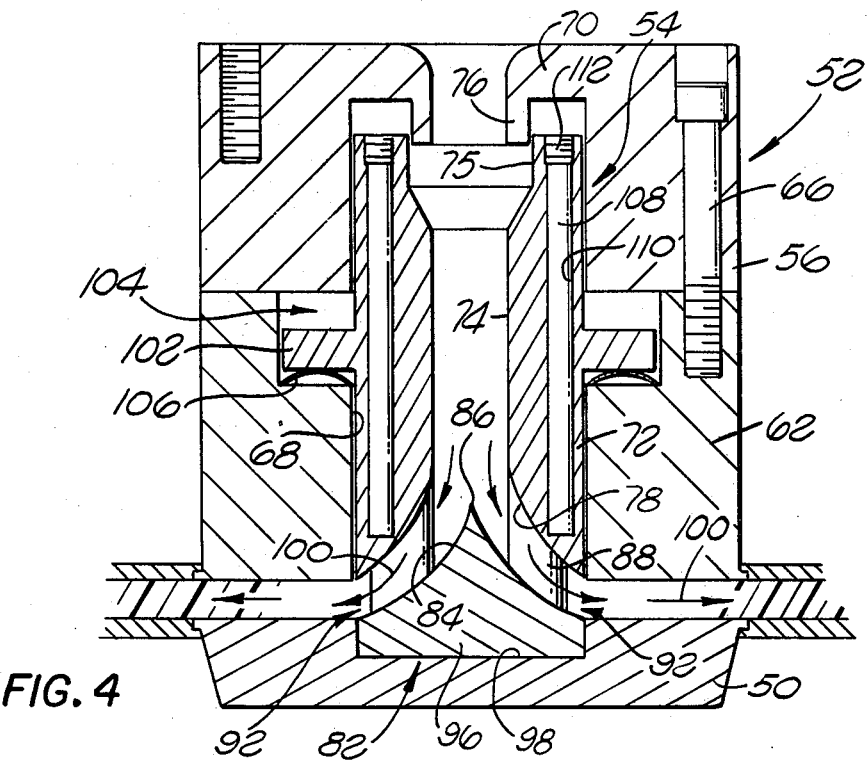
FIG. 4 is an enlarged fragmented cross-sectional view illustrating the hot sprue valve assembly in an open position to permit injection of molten material into the mold cavity.
Figure 5:
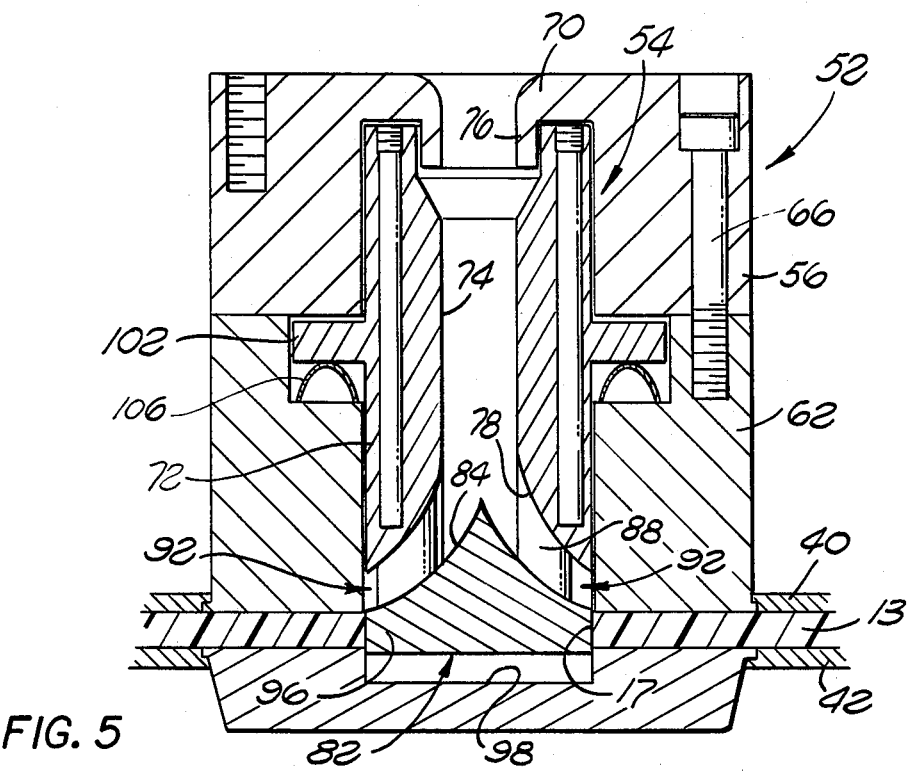
FIG. 5 is an enlarged fragmented cross-sectional view similar to FIG. 4 and illustrating the hot sprue valve assembly in a closed position to prevent passage of molten material into the mold cavity.

In operation, the valve member 54 is movable within the valve body 52 between an advanced or first position as viewed in FIG. 4 with the gate passages 92 in open communication with the mold cavity 25, and a retracted or second position as viewed in FIG. 5 with the gate passages withdrawn from communication with the mold cavity. More particularly, when it is desired to inject the molten disc-forming material into the mold cavity 25, the material is injected from the injector gun assembly in a molten, flowable state into the central opening 68 at the upper end of the valve body 52. The molten material passes downwardly through the central bore 74 of the movable sprue bushing 72 toward the dispersion head 82. The dispersion head 82 and the sprushing bushing 72 cooperate to turn the flow of molten material into an annularly uniform and radially outward direction for flow as illustrated by the arrows 100 into the mold cavity 25. When the valve member 54 is in the advanced position as viewed in FIG. 4 with the dispersion head base 96 seated within the clamp recess 98, the gate passages 92 are axially aligned with the mold cavity 25 for unimpeded flow of the molten material into the mold cavity.

When the mold cavity 25 is appropriately filled and packed with the disc-forming material, the valve member 54 is moved to the retracted position to prevent further flow of material into the mold cavity. More particularly, as viewed in FIG. 5, the valve member 54 is withdrawn upwardly within the valve body 54 to move the gate passages 92 to a position axially out of alignment with the mold cavity 25. Simultaneously, the base 96 of the dispersion head 82 is lifted partially from the clamp recess 98 for movement into the central region of the mold cavity. This base 96 is sized for slight reception into the central opening 68 of the valve body to close off communication between the gate passages 92 and the mold cavity 25. Moreover, in this position, the base 96 of the dispersion head 82 occupies the central region of the mold cavity to mold a central aperture 17 directly into the information disc 13 prior to solidification of the disc-forming material.

Movement of the valve member 54 within the valve body 52 can be accomplished in any suitable manner, such as by use of hydraulic or pneumatic actuator means for precise timed operation of the valve member. Alternatively, as viewed in FIGS. 1-5, pressure responsive spring means can be provided for permitting automatic movement of the valve member 54 in response to the pressure of disc-forming material within the sprue bushing bore 74.

More specifically, in the embodiment shown, the sprue bushing 72 of the valve member 54 includes a radially outwardly projecting flange 102 for reception into an annular chamber 104 defined between the upper and lower sections 56 and 62 of the valve body 52. This annular chamber 104 has an axial height greater than the axial thickness of the flange 102 whereby the valve member 54 is movable within the central opening 68 of the valve body 52 within limits defined by the axial height of the chamber 104.

A spring 106, such as a Belleville washer spring, is positioned within the annular chamber 104 at the underside of the sprue bushing flange 102. This spring 106 acts against the flange 102 to bias the valve member toward a normal position with the gate passages 92 retracted from the mold cavity 25 as viewed in FIG. 5. However, when the disc-forming material is injected under pressure into the sprue bushing 72, the material bears against the generally conical face 84 of the dispersion head 82 to urge the entire valve member 54 toward the advanced position as viewed in FIG. 4. This movement of the valve member 54 is achieved when the pressure acting upon the dispersion head 82 is sufficient to overcome the spring 106.

When the mold cavity 25 is filled and packed with the disc-forming material, the injector gun assembly is operated in a known manner to relieve the pressure acting upon the disc-forming material. When this occurs, the pressure acting upon the dispersion head is substantially reduced to permit the spring 106 to return the valve member 54 to the retracted position as viewed in FIG. 5. At this time, the molding apparatus is operated to circulate a suitable coolant into close proximity with the mold cavity 25, such as through passages 33 illustrated in FIG. 1, to cause rapid solidification of the material within the mold cavity whereby the mold halves 14 and 20 can be separated and the solidified information disc 13 removed from the machine.

The valve member 54 is conveniently adapted to receive appropriate heater means to maintain the temperature of the disc-forming material within the hot sprue valve assembly 12 at a sufficient level to prevent solidification of material therein. Such heater means can comprise so-called thermal pins in the form of a heat-conductive hollow cartridge 108 filled with a rarified heat-conductive gas, such as a thermal pin of the type manufactured and sold by the Kona Corporation of Gloucester, Massachusetts, wherein the cartridge 108 has a thermal conductivity substantially greater than that of the valve member 54. In use, the thermal pins are inserted into axially elongated holes 110 of the sprue bushing 72 and locked therein by set screws 112. The thermal pins effectively transfer heat energy from the portion of the valve assembly 12 adjacent the injector gun assembly down toward the gate passages 92 for appropriate temperature control of the material. Alternatively, any other type of heater means can be used, such as electrical resistance heaters positioned within the valve body 52 and/or within the sprue bushing 72 or the dispersion head 82 of the valve member 54.

The present invention thus provides an improved hot sprue valve assembly for controlling flow of disc-forming material into the mold cavity of an injection molding machine, particularly of the type for molding video information discs. The hot sprue valve assembly includes a sprue bushing and a dispersion head incorporated into a single movable valve member for simultaneously controlling molten material flow into the mold cavity and for molding a central aperture directly into the disc prior to disc solidification.

A wide variety of further modifications and improvements to the invention described herein are believed to be now apparent to one skilled in the art. Accordingly, no limitation upon the invention is intended, except by way of the appended claims.

What is claimed is:

1. A mold assembly for an injection molding machine, comprising:
   first and second mold halves movable toward each other to a closed position defining a disc-shaped mold cavity, and movable away from each other to an open position allowing a molded disc to be removed from said mold cavity;
   a valve body mounted on said first mold half and having a central opening formed therein;
   a valve member carried within the central opening for sliding movement toward and away from the mold cavity, said valve member including a sprue bushing having a central bore formed therein for passage of the material toward the mold cavity, and a dispersion head cooperating with said sprue bushing for defining an annular and radially outwardly open gate passage for flow of material from the bore into the mold cavity;
   means for controlling movement of said valve member between a first position with said dispersion head advanced at least partially through the mold cavity and said gate passage aligned with the mold cavity for flow of the material into the mold cavity when said first and second mold halves are in said closed position, and a second position with said gate passage retracted from alignment with the mold cavity and said dispersion head positioned generally within the mold cavity to mold a central aperture into the disc prior to solidification of the material within the mold cavity while said first and second mold halves are still in said closed position; and
   means defining a recess formed in said second mold half for receiving said dispersion head when said valve member is in said second position.

2. The mold assembly of claim 1 including heater means for controlling the temperature of said valve member.

3. The mold assembly of claim 1 wherein said means for moving said valve member comprises a spring for biasing said valve member toward said second position, said valve member being responsive to flow of the disc-forming material under pressure therethrough for movement to said first position.

4. The mold assembly of claim 1 wherein said sprue bushing includes a generally conical face extending from said bore radially outwardly and axially toward the mold cavity, and wherein said dispersion head includes a generally conical face presented toward and spaced from said sprue bushing face, whereby said generally conical faces of said sprue bushing and said dispersion head cooperate to define said gate passage.

5. The mold assembly of claim 4 including a plurality of circumferentially arranged spacer flights connected between said generally conical faces of said sprue bushing and said dispersion head, said spacer flights cooperating with said generally conical faces to define a plurality of radially outwardly open gate passages.

6. In an injection molding machine for producing centrally apertured record discs, a valve assembly for controlling flow of molten disc-forming material into a disc-shaped mold cavity, comprising:
   first and second mold halves movable toward each other to define the mold cavity and movable away from each other to allow a disc to be removed from the mold cavity;
   a valve body secured to said first mold half and having a central opening formed therein;
   a valve member carried within the central opening for sliding movement toward and away from the mold cavity, said valve member including a sprue bushing having a central bore formed therein for passage of the material toward the mold cavity, and a dispersion head cooperating with said sprue bushing for defining an annular and radially outwardly open gate passage for flow of material from the bore into the mold cavity;
   means for controlling movement of said valve member between a first position with said dispersion head advanced at least partially through the mold cavity and said gate passage aligned with the mold cavity for flow of the material into the mold cavity, and a second position with said gate passage retracted from alignment with the mold cavity and said dispersion head positioned generally within the mold cavity to mold a central aperture into the disc prior to solidification of the material within the mold cavity; and
   said second mold half including means for receiving said dispersion head when said valve member is in said second position.

7. The valve assembly of claim 6 wherein said dispersion head includes a face presented at least partially in an axial direction toward the bore in said sprue bushing, and wherein said controlling means comprises a spring for urging said valve member toward said second position, said valve member being movable to said first position in response to the pressure of disc-forming material passing through the bore and bearing against said dispersion head face.

* * * * *